US011261899B2

(12) United States Patent
Zander et al.

(10) Patent No.: US 11,261,899 B2
(45) Date of Patent: Mar. 1, 2022

(54) FLEXIBLE FASTENER

(71) Applicant: ILLINOIS TOOL WORKS INC., Glenview, IL (US)

(72) Inventors: Jason M. Zander, Roberts, WI (US); James S. Tisol, Jr., Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 4 days.

(21) Appl. No.: 16/662,225

(22) Filed: Oct. 24, 2019

(65) Prior Publication Data
US 2020/0132101 A1    Apr. 30, 2020

Related U.S. Application Data

(60) Provisional application No. 62/750,299, filed on Oct. 25, 2018.

(51) Int. Cl.
*F16B 21/08* (2006.01)
(52) U.S. Cl.
CPC .................... *F16B 21/084* (2013.01)
(58) Field of Classification Search
CPC ............ F16B 21/084; F16B 21/02; F16B 2005/0671; F16B 5/10; F16B 5/0642; B60R 13/0206; A44B 99/005; Y10S 411/908; Y10T 24/4578
See application file for complete search history.

(56) References Cited

U.S. PATENT DOCUMENTS

| 3,220,078 | A | * | 11/1965 | Preziosi | ............... F16B 21/086 411/349 |
| 4,262,394 | A | * | 4/1981 | Wright | ............... A44B 99/005 411/548 |
| 7,955,038 | B2 | * | 6/2011 | Silbereisen | ............ F16B 21/02 411/552 |
| 2003/0059255 | A1 | * | 3/2003 | Kirchen | ................. F16B 21/02 403/353 |

(Continued)

FOREIGN PATENT DOCUMENTS

| DE | 202004010746 U1 | 11/2004 |
| EP | 1220592 A1 | 7/2002 |
| JP | 54111561 U | 8/1979 |

OTHER PUBLICATIONS

International Search Report and Written Opinion of the International Searching Authority from corresponding PCT Application No. PCT/US2019/057803, dated Feb. 12, 2020 (16 pages).

*Primary Examiner* — Robert Sandy
*Assistant Examiner* — Rowland Do
(74) *Attorney, Agent, or Firm* — Quarles & Brady LLP

(57) ABSTRACT

A fastener includes a body, a fastener head having a flange extend radially outward from the body, and a plurality of shoulders that extend outwardly from the body. The body also includes a finger that extends from one end of each of the shoulders. The body further includes a plurality of cutouts positioned on the body between the shoulders. The body is flexible along the cutouts. The fingers are also flexible and cooperate with a plurality of locking features of a first component to sufficiently hold the first component and a second component between the fingers and the flange.

18 Claims, 14 Drawing Sheets

(56) References Cited

U.S. PATENT DOCUMENTS

| | | | |
|---|---|---|---|
| 2004/0170491 A1* | 9/2004 | Hulin | F16B 21/02 411/553 |
| 2012/0073089 A1* | 3/2012 | Buillas | B60R 13/0206 24/293 |
| 2015/0089778 A1* | 4/2015 | Tisol, Jr. | F16B 21/02 24/663 |
| 2016/0040705 A1* | 2/2016 | Peter | F16B 21/02 403/348 |

* cited by examiner

FLEXIBLE FASTENER

CROSS REFERENCE TO RELATED APPLICATIONS

This application is based on, claims priority to, and incorporates herein by reference in its entirety U.S. Provisional Application Ser. No. 62/750,299, filed on Oct. 25, 2018, and entitled "Flexible Twistlok."

REFERENCE REGARDING FEDERALLY SPONSORED RESEARCH OR DEVELOPMENT

Not applicable

SEQUENCE LISTING

Not applicable

BACKGROUND OF THE INVENTION

1. Field of the Invention

The present invention relates generally to fasteners and, more particularly, to fasteners configured to secure one or more components together, such as panels within or around a vehicle that are secured together during the manufacturing process of the vehicle.

2. Description of the Background of the Invention

Fasteners may be used in a variety of applications, including automobile manufacturing. For example, during a manufacturing process for a vehicle, various components may be secured together by a fastener or fastener assembly. Particular examples may include an interior frame panel that may be secured to an exterior panel, or an air bag assembly that may be secured to an interior door panel or glove compartment panel. As another example, an underbody aerodynamic shield may be secured to a plastic vehicle panel. Typically, components are secured together using one or more fasteners or fastener assemblies, such as plastic rivet style fasteners.

Many known plastic fasteners are configured to secure two panels of a particular size. In the instance that a panel is not of a particular size, the fastener is typically modified to accommodate the panels or a new fastener is required, causing an undue burden during the manufacturing process. Further, many prior art fastener assemblies are standardized to a specific tolerance or size. As such, many prior art fasteners allow for a narrow range of panel thicknesses.

A need therefore exists for a fastener with increased functionality by allowing a single fastener for use in panels with a wider thickness range. Further, a need exists for a fastener that has a wider thickness range while maximizing failure load. Even further, a need exists for a fastener with the aforementioned characteristics that may be easily installed, or removed, during a manufacturing process or maintenance service.

SUMMARY OF THE INVENTION

In one aspect, a fastener comprises a body and a fastener head that has a flange extending radially outward from the body. The fastener further includes a plurality of shoulders extending outwardly from the body and a finger extending from one end of each of the shoulders. The fastener also includes a plurality of cutouts positioned on the body between the shoulders, and the body is flexible along the cutouts. The fingers are flexible and cooperate with locking features of a first component to sufficiently hold the first component and a second component between the fingers and the flange.

In related embodiments, the fingers may protrude from the shoulders, toward the flange, and flex along a pivot point to secure the first component and the second component. Further, the pair of cutouts may comprise two sidewalls that converge toward each other. Each of the sidewalls may comprise a locking component that mates with a locking component of the other sidewall to lock the sidewalls of the cutouts together during application of an extraction force. The body may be cylindrical and comprise a hollow cavity. The hollow cavity may comprise a plurality of ribs and support members that extend from the shoulders to the fastener head. The ribs and the support members may also increase the fastener's maximum failure load. The locking features of the first component may comprise a locking ramp and a depression, and the fingers of the fastener may lock within the depression and the locking ramp of the first component when installed. Further, the fastener may only rotate in one direction to lock the first component and the second component together. Additionally, the same direction may be used to unlock the fastener from the first component and the second component.

In another aspect, a fastener comprises a body that includes a fastener head and a pair of opposing shoulders that extend outwardly from the body, and a finger that extends from an end of each of the shoulders and includes a flexible free end that cooperates with a plurality of locking features of a first component. The fastener further includes a pair of cutouts within the body and which extend toward the fastener head. The cutouts are positioned on opposite sides of the body. The body is flexible along the cutouts to allow the body to flex with the fingers to secure the first component and a second component.

In some embodiments, the body may be cylindrical and comprise a hollow cavity. The hollow cavity may have a plurality of support members extend throughout the hollow cavity. The fastener may only rotate in one direction to lock the first component and the second component together. Further, the fastener head may comprise a flange extending radially outward from an upper portion of the body. The flange may include two convex ridges that bow outwardly toward an outer edge of the flange, and each of the ridges may include a finger tab and a groove inverse of each other with respect to the ridge. The locking features of the first component may comprise a locking ramp, a depression, and an unlocking ramp, and the fingers of the fastener may lock within the depression between the locking ramp and the unlocking ramp. The fingers may also allow for up to a 2.0 mm thickness variations in the first component and the second component, and the cutouts may also allow for up to a second 2.0 mm thickness variation in the first component and the second component.

In a further aspect, the present disclosure provides a fastener that comprises a cylindrical body that includes a fastener head and a pair of shoulders that extend outwardly from a lower portion and on opposite sides of the cylindrical body. The cylindrical body further includes a hollow cavity. The fastener further includes a finger extending from a top end of each of the shoulders and has a flexible free end that cooperates with a plurality of locking features of a first component. The fastener also includes a pair of cutouts that are positioned at opposite sides of the cylindrical body and between the pair of shoulders. The cutouts further extend from a lower portion of the cylindrical body toward a positon near the fastener head. The cylindrical body is flexible along the cutouts to allow the cylindrical body to flex with the fingers and secure the first component and a second component. Further, the pair of cutouts comprise locking components that lock the two sidewalls of the cutouts together during application of an extraction force.

In related embodiments, the locking components may comprise a circular protrusion and a recessed area, and the circular protrusion may lock within the recessed area to strengthen the fastener during application of the extraction force. The fastener provides an audio and tactile verification once installed.

The foregoing and other aspects and advantages of the disclosure will appear from the following description. In the description, reference is made to the accompanying drawings, which form a part hereof, and in which there is shown by way of illustration a preferred configuration of the disclosure. Such configuration does not necessarily represent the full scope of the disclosure, however, and reference is made therefore to the claims herein for interpreting the scope of the disclosure.

BRIEF DESCRIPTION OF THE DRAWINGS

The invention will be better understood and features, aspects, and advantages other than those set forth above will become apparent when consideration is given to the following detailed description thereof. Such detailed description makes reference to the following drawings.

Figure 1:
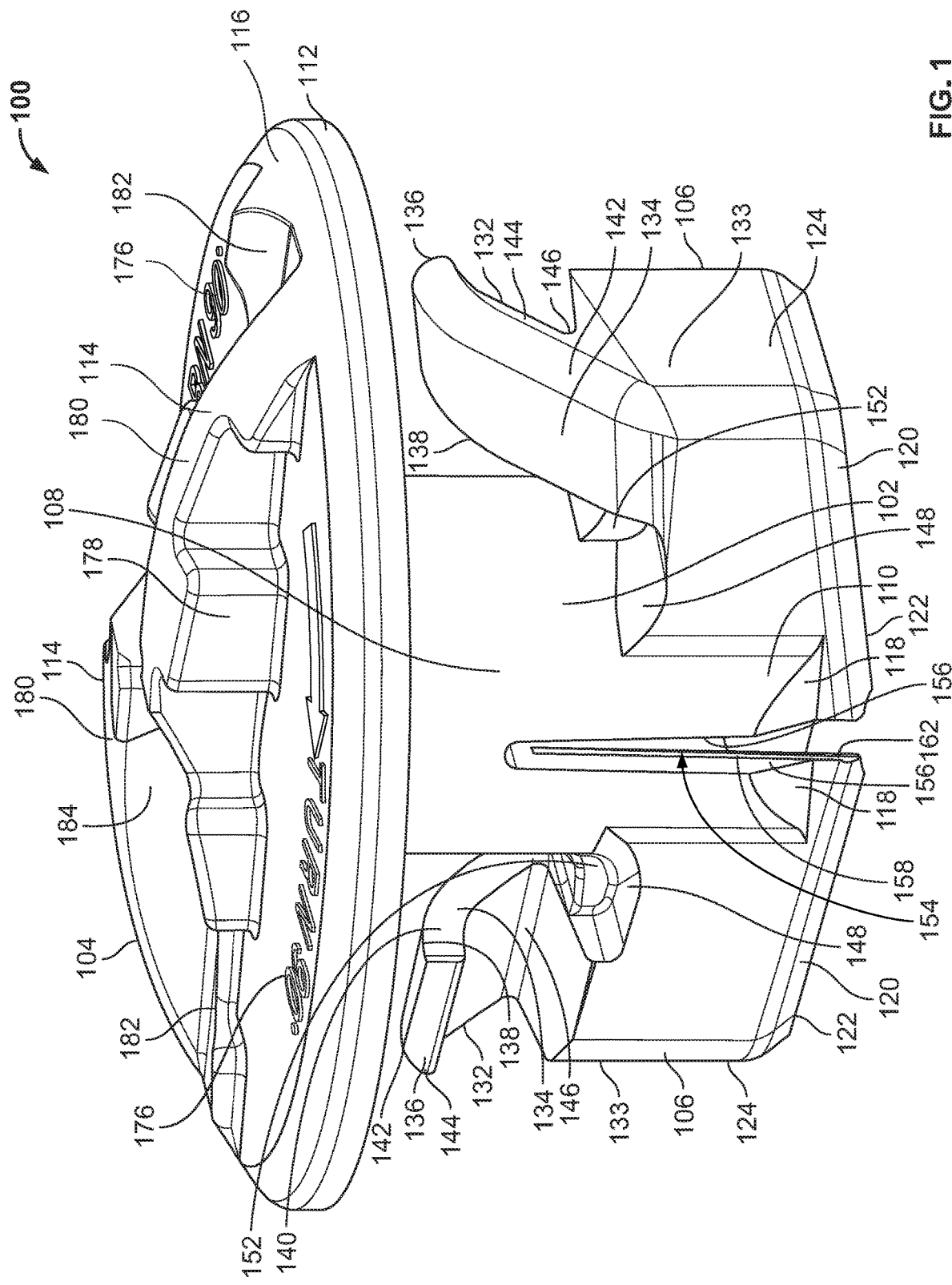
FIG. 1 is a front, top, and left side isometric view of a fastener, according to one embodiment.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DRAWINGS

Certain embodiments of the present disclosure provide a fastener that may be used with a wide range of component thicknesses. Other embodiments provide increased fastener strength. In fact, in a preferred embodiment the fastener is configured for use with panels or components having a wider thickness range while maximizing failure load. Further, the fastener may be configured to be easily serviced and removed multiple times without compromising the strength of the fastener.

Figure 2:
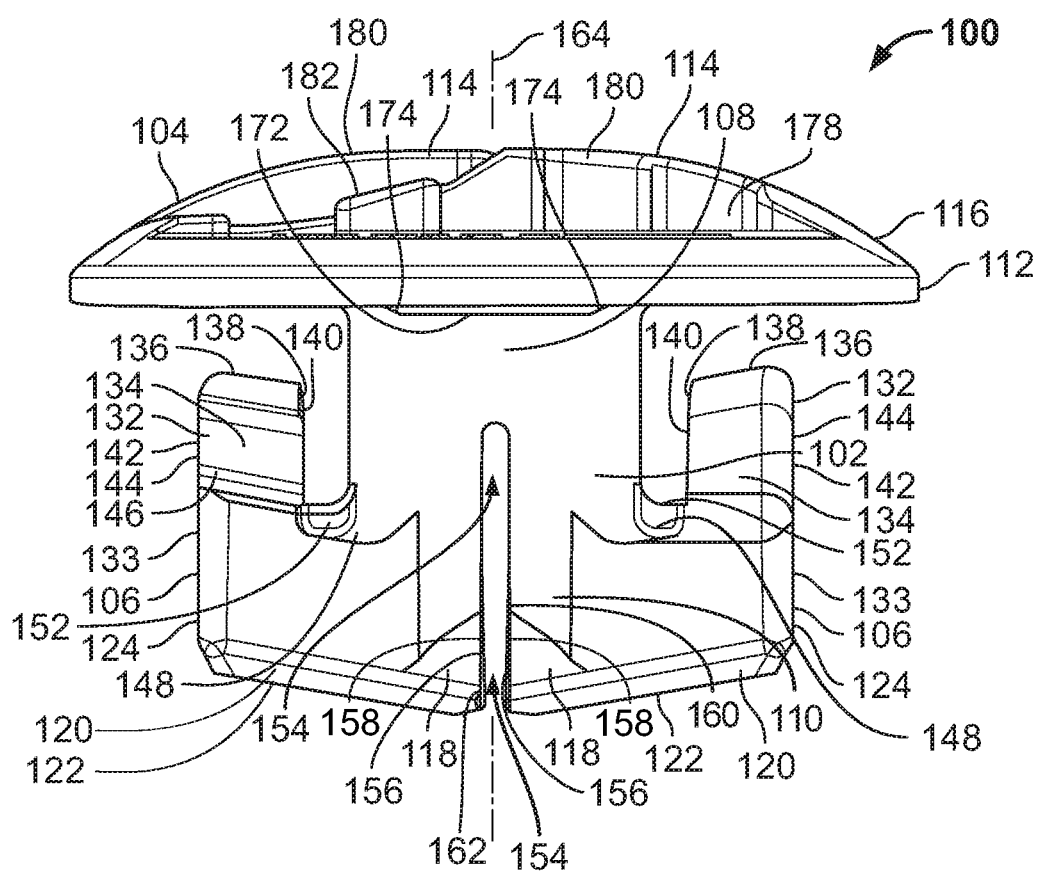
FIG. 2 is a front elevational view of the fastener of FIG. 1.

FIGS. 1 and 2 illustrate a fastener 100 according to an embodiment of the present disclosure. The fastener 100 may include a fastener body 102 integrally molded and formed with a fastener head 104 and a plurality of fastener shoulders 106. In this embodiment, the fastener 100 comprises two opposing shoulders 106 extending outwardly from the body 102, however any number of shoulders 106 may be formed with the body 102. Further, the body 102 has a cylindrical configuration extending from the head 104 to the shoulders 106 and comprising an upper portion 108 and a lower portion 110. As noted herein, the head 104 is attached to the upper portion 108 of the body 102 and may comprise a circular flange 112 extending radially outward from the upper portion 108 of the body 102. Furthermore, the flange 112 may comprise a disk shaped design that includes two center ridges 114 with a space therebetween. As seen from FIG. 2, the ridges 114 can form a convex-down configuration that bow outwardly toward an outer edge 116 of the flange 112. In an alternative embodiment, the flange 112 can comprise any shape, such as a square or hexagonal shape, for example.

The fastener 100 may be formed from a plastic material, such as polyamide (PA), polybutylene terephthalate (PBT), polyoxymethylene (POM). In other embodiments, the fastener 100 may be formed from polyethylene terephthalate (PET), high-density polyethylene (HDPE), polyvinyl chloride (PVC), low-density polyethylene (LDPE), and/or polypropylene (PP), for example.

Still with reference to FIGS. 1 and 2, the shoulders 106 are attached to the lower portion 110 and on opposite sides of the body 102. Each shoulder 106 may comprise a rectangular shape that extends outwardly from the body 102 on two sides. In other embodiments, the fastener 100 can include any number of shoulders 106 such that it can effectively function and fasten a component. As mentioned above, the body 102 is integrally molded with the shoulders 106 and may comprise a plurality of lead-in edges 118 that slope inwardly and connect with the shoulders 106. Further, the shoulders 106 may also include a chamfered bottom end 120 with a flat base 122 located near a bottom 124 of the shoulder 106. In the present embodiment, the chamfered bottom end 120 and the lead-in edges 118 may assist a user in inserting the fastener 100 into an aperture 126 of a first component 128 and a second component 130 (see FIG. 9).

Referring again to FIGS. 1 and 2, each shoulder 106 may include a finger 132 extending from a top end 133 of the shoulder 106, and the finger 132 may also extend above and directly over their respective shoulder 106. In this embodiment, the fingers 132 can comprise an angled wall 134 that protrudes outwardly from the shoulders 106, toward the flange 112, and a relatively flat, flexible, free end 136. Partially, the angled wall 134 may extend upwardly toward the flange 112 of the head 104 while maintaining a position directly over its respective shoulder 106. In another embodiment, the fingers 132 may extend past the shoulders 106 or extend to any height thereafter. The angled wall 134 eventually flattens out and terminates at the free end 136. Moreover, the fingers 132 may have a corner edge 138 facing the body 102, defining a flat sidewall 140, and a rounded edge 142 facing away from the fastener 100 and defining a rounded sidewall 144. As seen in FIG. 2, the free end 136 of the fingers 132 angle downward toward the body 102 of the fastener 100 from the rounded edge 142 toward the corner edge 138. In other embodiments, the free end 136 may be generally flat or parallel with the flange 112 of the fastener head 104. In a further embodiment, the shape of the fingers 132 can vary to accommodate different component thicknesses. For instance, the free end 136 may be larger or smaller, or the free end 136 may be a different shape, such as oval, circular, or square, for example. In alternative embodiments, none of the shoulders 106 of the fastener 100 include the finger 132.

The fingers 132 are flexible components that can flex downwardly toward the shoulder 106. Further, the fingers 132 may pivot or flex along a pivot point 146 at the base of the angled wall 134. As seen in FIGS. 1 and 2, the fingers 132 are positioned in opposite directions, extending inversely from each other. As described in more details below, the fingers 132 are configured to work with the rotation of the fastener 100 and thus are positioned in such a configuration. However, in other embodiments, the fingers 132 can extend in any direction or be positioned parallel to each other. Moreover, the fastener 100 can comprise any number of fingers 132 in order to effectively secure the first component 128 and the second component 130.

As illustrated in FIG. 2, the bottom of the shoulders 106, defining the chamfered bottom ends 120, extend upwardly at an angle away from the lower portion 110 of the body 102. This angle is configured to be similar or parallel to the angle defined by the free end 136 of the fingers 132. Opposite of the chamfered bottom ends 120, the shoulders 106 may include a joint 148 connecting the top end 133 of the shoulder 106 with the body 102. As seen in FIG. 2, the joint 148 can comprise a reinforced area 152 with extra material thickness. Particularly, the reinforced area 152 reinforces the part while maximizing failure load. As noted herein, this thickness of the reinforced area 152 can be any size, depending on the required failure load of the fastener 100. In other words, the fastener 100 can be modified or altered to meet the requirements of the manufacturer. In other embodiments, the fastener 100 may not comprise the reinforced area 152.

Referring back to FIGS. 1 and 2, the body 102 may include a pair of cutouts 154 extending from the lower portion 110 of the body 102 toward the head 104. For example, the cutouts 154 may run along the center of the body 102 and include two sidewalls 156 converging toward each other. Further, the cutouts 154 may be positioned on opposite sides of the body 102 and between the shoulders 106 to help the body 102 flex during installation. This additional flex support allows the fastener 100 to maintain a high failure load with increased component or part thickness. In another embodiment, the fastener 100 can include more or fewer cutouts 154 to help facilitate flexing of the fastener 100. In a further embodiment, the cutouts 154 may extend higher or lower up the body 102 of the fastener 100.

Figure 3:
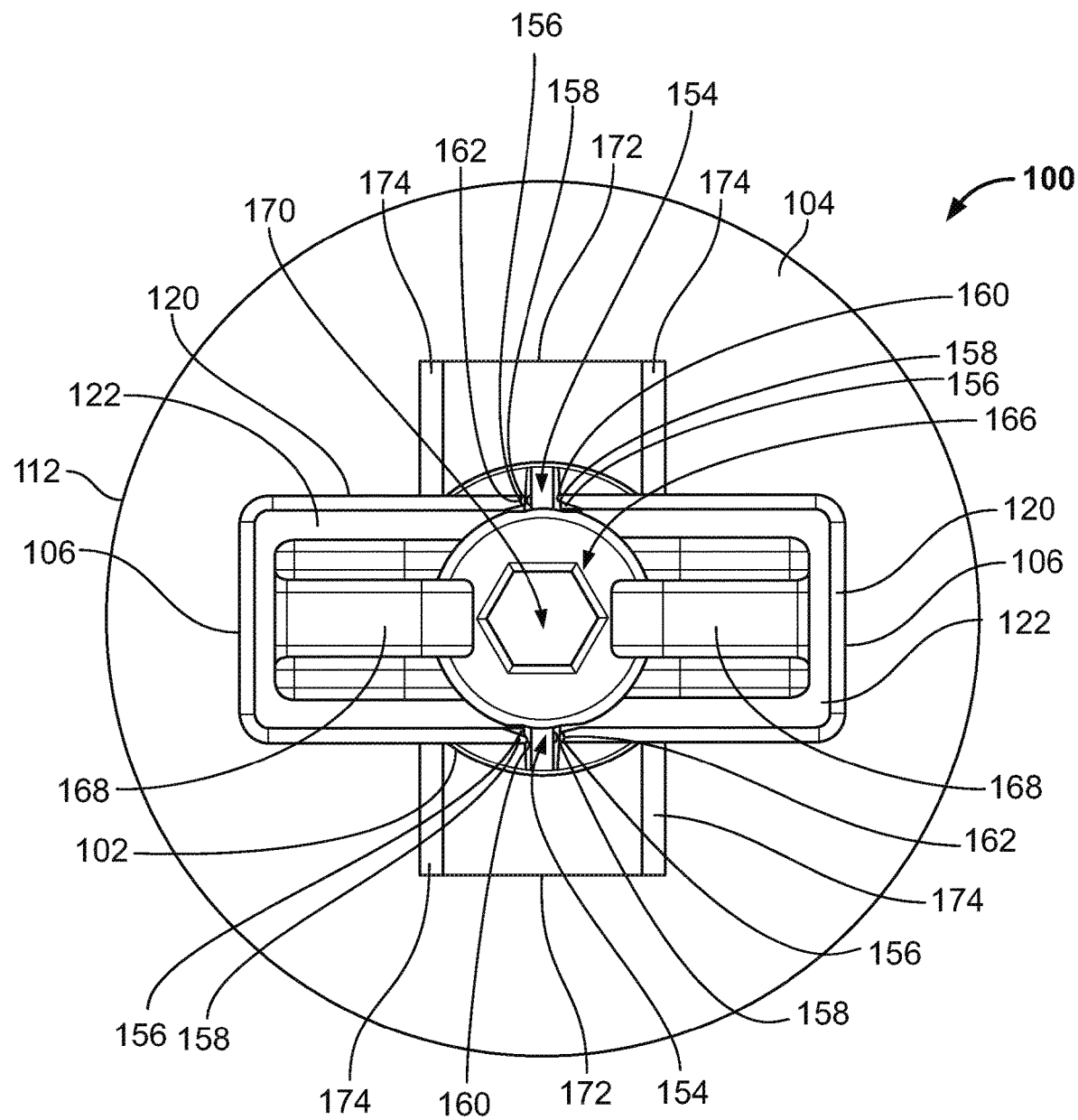
FIG. 3 is a bottom plan view of the fastener of FIG. 1.

As seen in FIGS. 1, 2, and 3, the cutouts 154 can include locking components 158 that allow the two sidewalls 156 of the cutout 154 to lock with each other in order to maximize clip retention strength. In other words, the locking components 158 of one sidewall 156 may mate with the locking components 158 of the other sidewall 156. Under an extraction load or force (separation of the components or panels), the body 102 of the fastener 100 will flex together. Therefore, by locking the two halves of the cutouts 154 together, the extraction force can be maximized prior to part failure. For example, the extraction force can increase by approximately 10%-30%. In the present embodiment, the locking components 158 may comprise a circular protrusion 160 and a recessed area or circular concave edge 162. During operation, the protrusion 160 will lock within the recessed area 162 to strengthen the fastener 100 during application of the extraction force. In other embodiments, the protrusion 160 and the recessed area 162 may comprise a different geometric shape other than a circle or semi-circle. For example, the locking components 158 can comprise any shape as long as one shape can slide into the recessed area 162 of the other. In other embodiments, the cutouts 154 can comprise flat sidewalls 156 with no locking components 158. In a further embodiment, the body 102 may have no cutouts 154.

Turning back to FIG. 2, the body 102 and the shoulders 106, excluding the fingers 132, define a generally symmetric configuration along a center axis 164 of the fastener 100. As such, the symmetrical configuration allows for easier manufacturing of the part and better performance during operation of the fastener 100.

As illustrated in FIG. 3, the shoulders 106 and the body 102 define a hollow cavity 166 therebetween. The cavity 166 may comprise two reinforcement ribs 168 extending along the shoulders 106 and through the body 102 of the fastener 100. In preferred embodiments, the ribs 168 may conclude at the head 104 of the fastener 100. Similar to the reinforced area 152 of the shoulders 106, the ribs 168 are used to reinforce the fastener 100 and maximize failure load. Depending on the maximum failure load required, the ribs 168 can comprise any thickness. In an alternative embodiment, the cavity 166 may not have any ribs 168 extending through the fastener 100. Further, in this embodiment the cavity 166 may comprise a hole 170 extending through the head 104 of the fastener 100. In particular, the hole 170 may comprise a hexagonal shape that extends through the flange 112 of the head 104. However, the hole 170 can take any shape such as a circle, square, triangle, or octagon, for example. Once the fastener 100 is installed, the hole 170 may allow water to drain through the fastener 100.

With reference still to FIG. 3, the flange 112 may include a rectangular protrusion 172 spanning from the flange 112 on both sides of the body 102. In this embodiment, the protrusions 172 can interact with the second component 130 to allow for increased rigidity of the part. Further, the rectangular protrusion 172 may also comprise two chamfered ends 174 that assist the user in fastening the component. In another embodiment, the flange 112 may include any number of rectangular protrusions 172 extending out from the flange 112. In further embodiments, only one of the chamfered ends 174 of the rectangular protrusions 172 may be chamfered while the other may comprise a corner or ledge.

Figure 4:
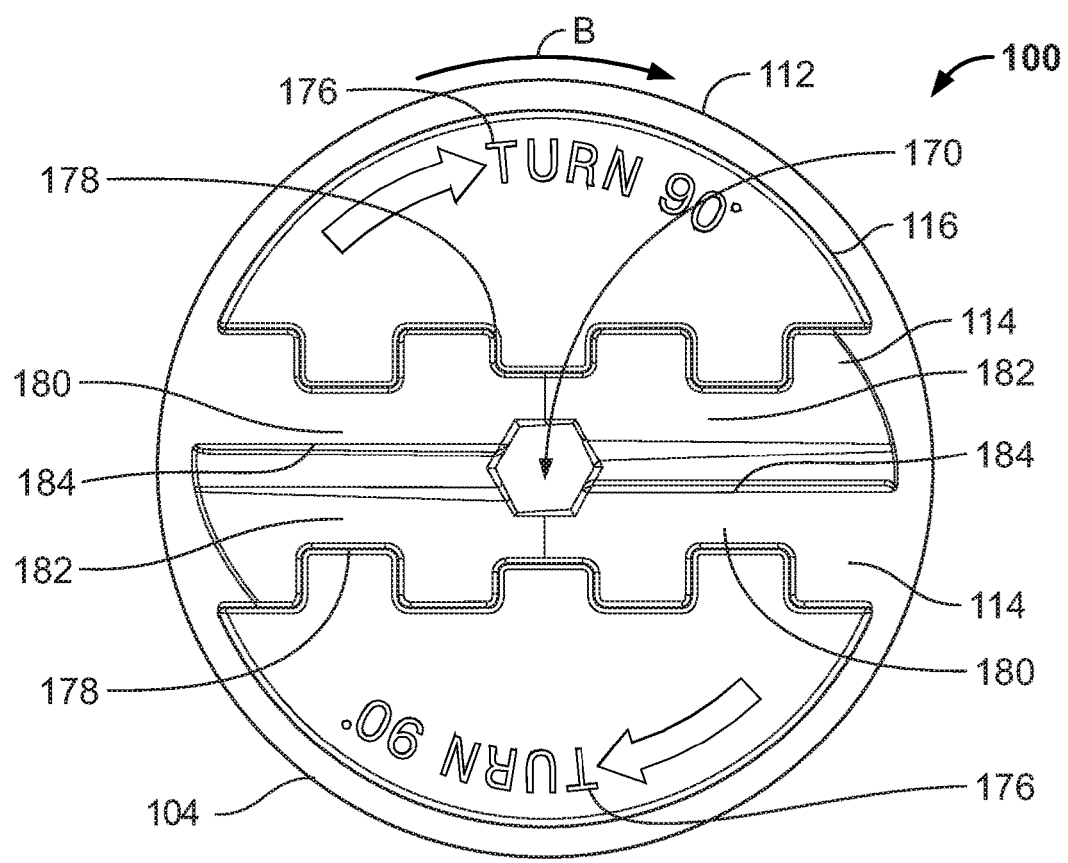
FIG. 4 is a top plan view of the fastener of FIG. 1.

Turning to FIGS. 1 and 4, the hole 170 can be seen extending through the middle of the flange 112. Located near the outer edge 116 of the flange 112, a plurality of graphics 176 may be included to indicate to the user how to operate the fastener 100. Adjacent to the graphics 176, the ridges 114 of the fastener head 104 may comprise a sinusoidal square wave pattern 178 as a manufacturing feature.

Figure 9:
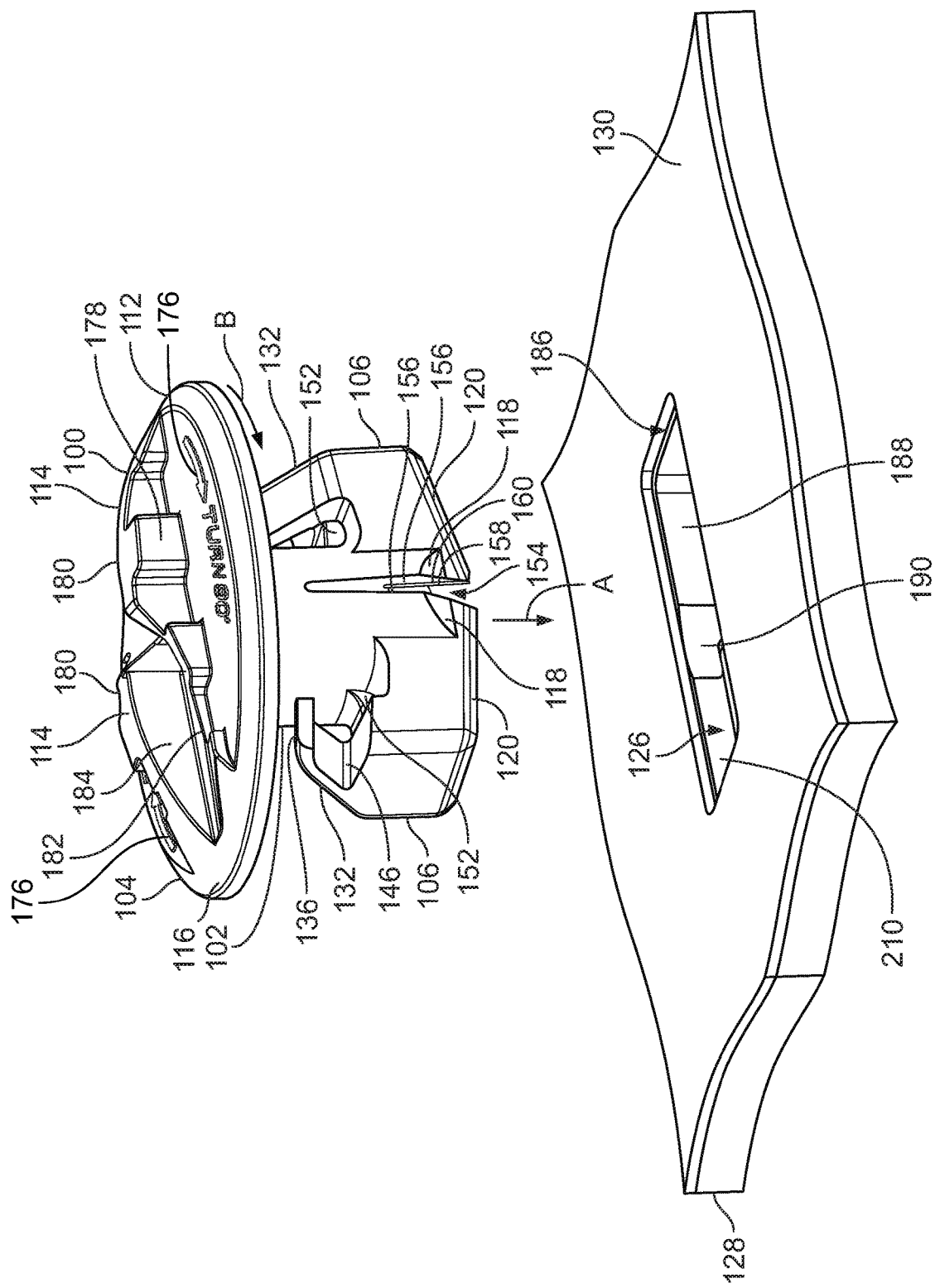
FIG. 9 is an isometric view of the fastener of FIG. 1 aligned with the first and the second component of FIG. 5.

With reference to FIGS. 1 and 9, both ridges 114 may bow outwardly toward the outer edge 116 of the flange 112. As such, each ridge 114 may include a finger tab 180 and a groove 182. In this embodiment, the finger tab 180 is the high portion of the ridge 114, relative to the flange 112, and includes a flat wall 184 extending down to the flange 112, opposite the sinusoidal square wave pattern 178. Further, the ridge 114 may extend down from the finger tab 180 to the groove 182, defining the low point of the ridge 114, i.e., nearest to the flange 112. In particular, the groove 182 my define a valley or gully in the ridge 114. In preferred embodiments, each ridge 114 is inverse to the other such that the groove 182 of one ridge 114 matches with the finger tab 180 of the other ridge 114 and vise-versa (see FIG. 4).

In the present embodiment, the grooves 182 are designed to receive a user's finger when turning the fastener 100. During installation, the user places their finger against the flat wall 184 of the finger tab 180, and therefore in the corresponding groove 182 of the other ridge 114, to turn the fastener 100. As such, the finger tabs 180 and grooves 182 are designed in such a configuration that the user can intuitively know the correct direction in which to turn the fastener 100.

Figure 5:
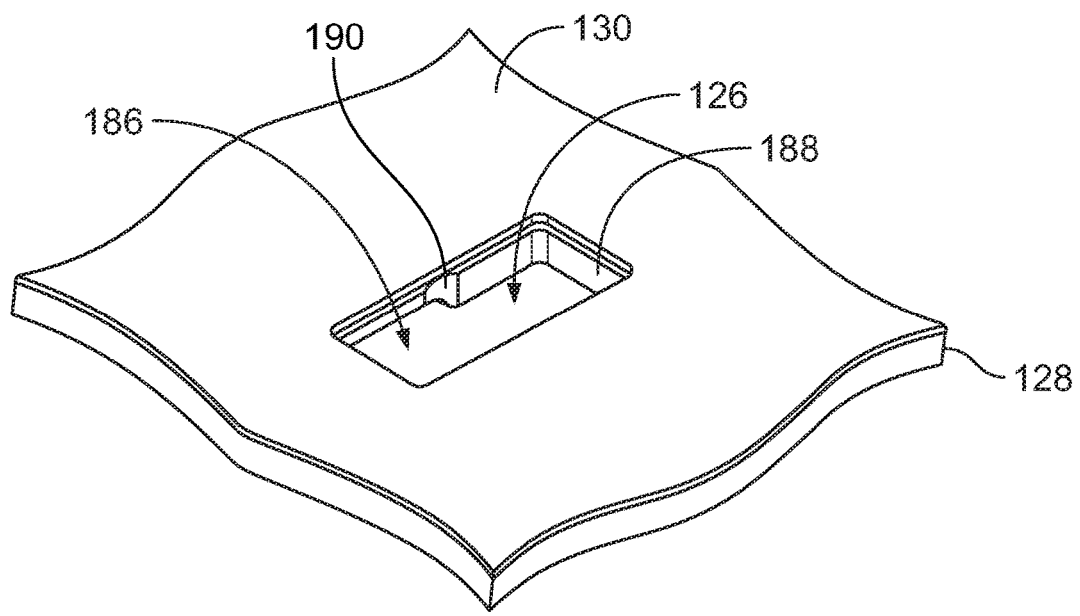
FIG. 5 is a front, top, and left side isometric view of a first component and a second component.

With reference to FIG. 5, the first component 128 (such as a plastic panel) is shown below the second component 130 (such as an aluminum panel). In preferred embodiments, the second component 130 is configured to sit on top of the first component 128 such that the fastener 100 can secure the first component 128 to the second component 130. Further, the second component 130 may comprise a clearance hole 186 for receiving the fastener 100. In the present embodiment, the clearance hole 186 can be oversized to allow for easier alignment with the aperture 126 of the first component 128. Additionally, the clearance hole 186 may be wider than the aperture 126 of the first component 128, but still smaller than the flange 112 of the fastener 100. In this particular embodiment, the clearance hole 186 is generally rectangular, but may comprise alternative geometric shapes that may be regular, e.g., circular or oval, or irregular, such that the fastener 100 can securely fit through the clearance hole 186. Moreover, the second component 130 may be positioned generally flat against the first component 128, such that no space exists therebetween. In alternative embodiments, other components or portions may exist between the first component 128 and the second component 130. Additionally, the first component 128 and the second component 130 can be any size.

Figure 6:
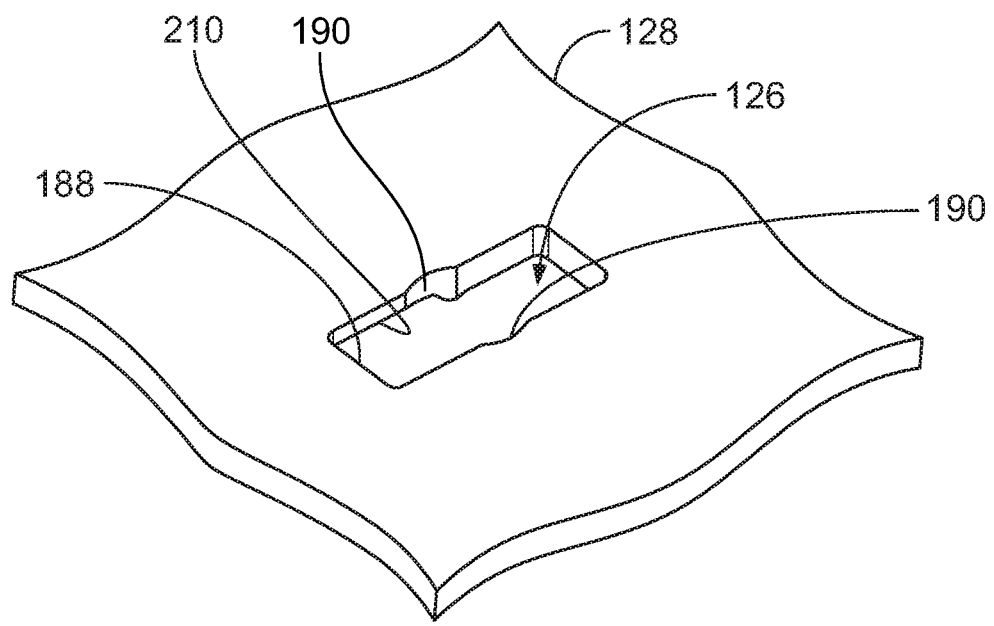
FIG. 6 is a front, top, and left side isometric view of FIG. 5 with the second component removed.

Turning to FIG. 6, the first component 128 may include internal edges 188 that define the aperture 126. In the present embodiment, the aperture 126 is generally rectangular, however the aperture 126 may comprise any shape in order to mate with the shape of the fastener 100. As noted herein, the internal edges 188 may comprise cylindrical side walls 190 positioned opposite of each other. As such, the cylindrical side walls 190 may align with the cylindrical shape of the body 102 of the fastener 100 (see FIG. 1). In an alternative embodiment, the cylindrical side walls 190 may comprise any shape such as a square or triangle, for example, to correctly mate with the fastener 100. In this embodiment, the cylindrical side walls 190 allow for the fastener 100 to be inserted in a specific position during installation, and therefore correctly lock the fastener 100 once installed (see FIG. 9).

Figure 7:
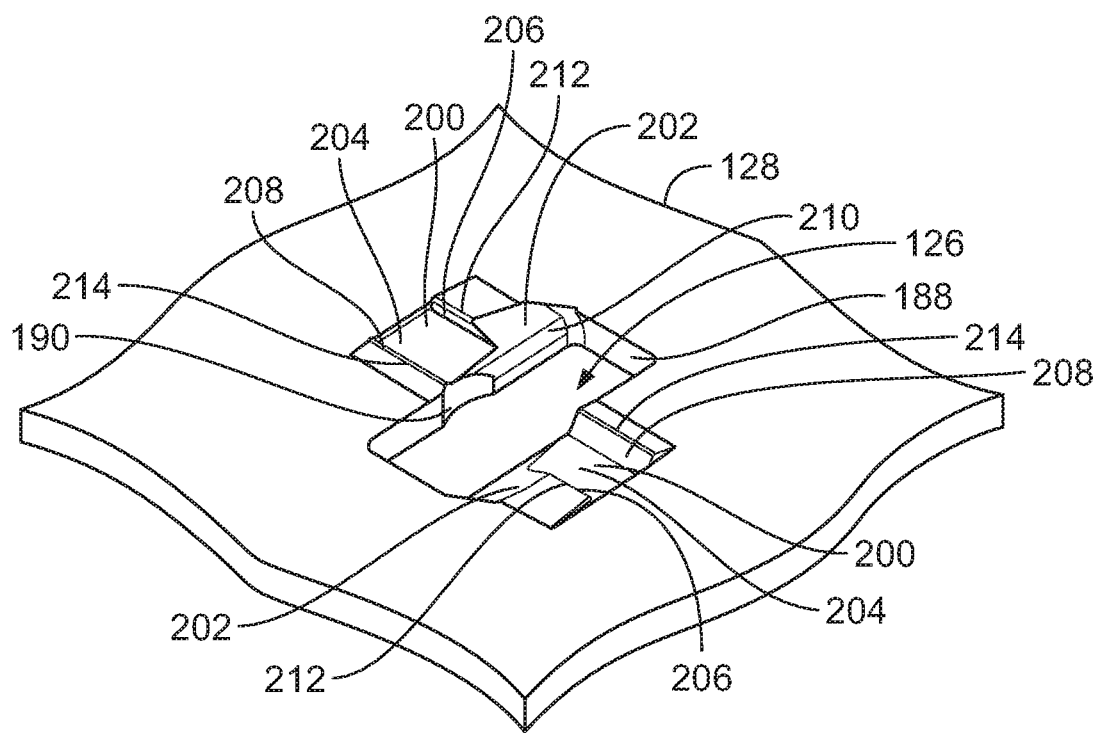
FIG. 7 is a bottom isometric view of FIG. 6.
Figure 8:
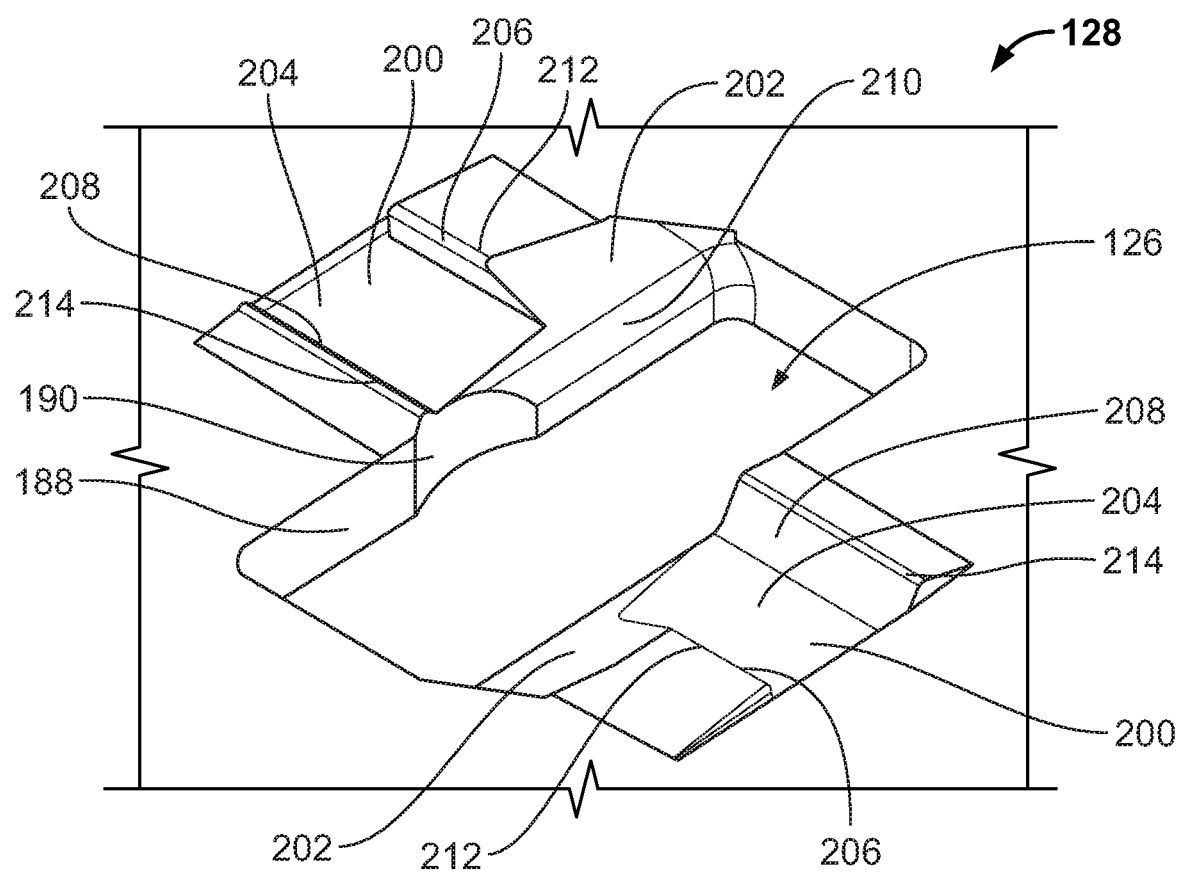
FIG. 8 is an enlarged view of a section of FIG. 7.

With reference to FIGS. 7 and 8, the bottom side of the first component 128 may include two locking features 200 positioned on opposite sides of the aperture 126. As will be discussed in further detail herein, the locking features 200 assist in locking and unlocking the fastener 100 to/from the first component 128 and the second component 130. In this embodiment, the locking features 200 may interact with the fingers 132 of the fastener 100 (see FIG. 12). In other embodiments, more or fewer locking features 200 may exist to secure the first component 128 and the second component 130 together. In a preferred embodiment, the number of locking features 200 may match the number of fingers 132 of the fastener 100. Further, the locking features 200 can be mirror images of each other so as to follow the configuration of the fingers 132 of the fastener 100 depicted in FIG. 12.

With reference to FIG. 8, each locking feature 200 may comprise a lead-in wall 202, a depression 204, a locking ramp 206, and an unlocking ramp 208. In this embodiment, the internal edges 188 located near the locking features 200 may comprise smooth edges 210. As will be discussed in further detail, the smooth edges 210 assist in the rotation of the fingers 132 along the lead in wall 202. As noted herein, the lead-in wall 202 may comprise an angled, smooth surface extending from the smooth edges 210 of the internal edges 188 defining the aperture 126 to the locking ramp 206. As such, the lead-in walls 202 work integrally with the smooth edges 210 of the internal edges 188 to guide the fingers 132 into a locked or installed position.

With reference again to FIGS. 7 and 8, the lead-in wall 202 ends at the locking ramp 206, which extends into the depression 204. In preferred embodiments, the locking ramp 206 extends at a 90° angle from the top of the lead-in wall 202, and may form one side of the depression 204. However, this angle is non-limiting and can be any angle such that the locking ramp 206 comprises a generally vertical wall, perpendicular to the first component 128. Moreover, the locking ramp 206 can comprise two surfaces that meet at a point 212 offset from the flat surface of the first component 128. In this embodiment, the point 212 of the locking ramp 206 may not be aligned with the surface of the first component 128 and may appear as a protrusion extending from the first component 128.

The depression 204 may span from the locking ramp 206 to the unlocking ramp 208, and the depression 204 may extend into the first component 128. In particular embodiments, the depression 204 may be configured to match the shape of the free end 136 of the fingers 132 (see FIG. 12). In alternative embodiments, the depression 204 can be any shape as long as the free end 136 of the fingers 132 can fit therein.

As discussed above, the unlocking ramp 208 may define one wall of the depression 204. In preferred embodiments, the unlocking ramp 208 may extend upwardly at an angle from the depression 204. Unlike the locking ramp 206, the unlocking ramp 208 may include a gradual slope extending out of the depression 204. Therefore, it is substantially easier for a surface to exit the depression 204 from the unlocking ramp 208 than any other side. Further, the unlocking ramp 208 may comprise an apex 214 that extends out of the first component 128. In one embodiment, the apex 214 may be formed from the unlocking ramp 208 and another surface extending down toward the first component 128. Similar to the point 212, the apex 214 may seem like a protrusion extending from the first component 128.

With reference to FIG. 9, the fastener 100 is shown aligned with the first component 128 and the second component 130. As discussed above, the first component 128 and the second component 130 may be configured to receive the fastener 100 through the aperture 126 and the clearance hole 186, respectfully. As such, the shoulders 106 of the fastener 100 are aligned with the aperture 126 and clearance hole 186 prior to insertion of the fastener 100. Once aligned, the fastener 100 is then urged into the clearance hole 186 and the aperture 126 in the direction of arrow A. Upon urging of the fastener 100, the lead-in edges 118 of the body 102 and the chamfered bottom end 120 of the shoulders 106 guide the fastener 100 into a centered position with respect to the clearance hole 186 and the aperture 126 by aligning with the internal edges 188. The internal edges 188 of the aperture 126 slide over the lead-in ledges 118 and the chamfered bottom ends 120, resulting in the shoulders 106 of the fastener 100 sliding fully through the aperture 126, and therefore the clearance hole 186. After the shoulders 106 are through the clearance hole 186 and the aperture 126, the fastener 100 is then urged until the flange 112 of the fastener head 104 makes contact with the second component 130. Once the flange 112 is in contact with the second component 130, the fastener 100 is ready to be locked. In the present embodiment, the flange 112 may be flush with the second component 130. However, in an alternative embodiment, there may exist another component or structure between the flange 112 and the second component 130.

Figure 10:
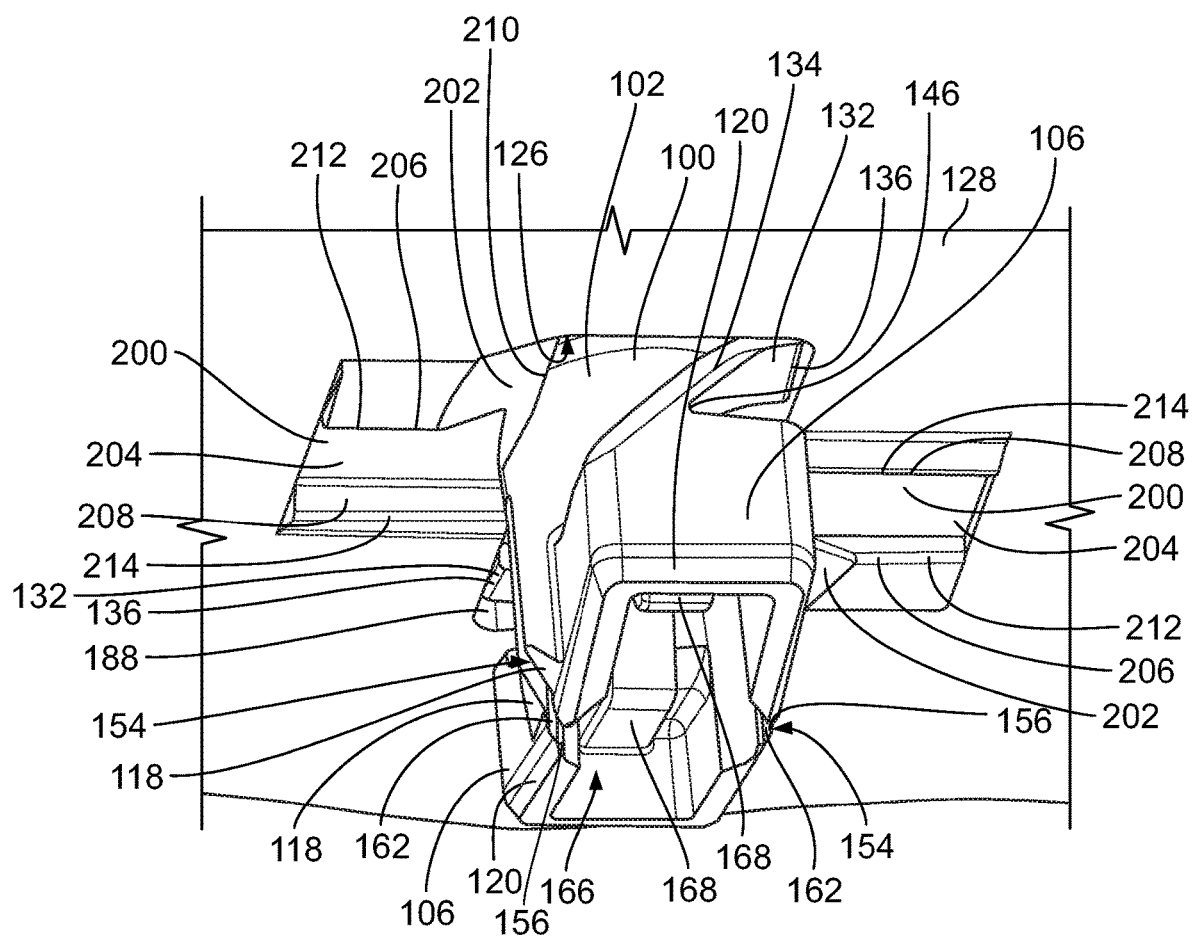
FIG. 10 is a bottom isometric view of the fastener of FIG. 1 initially inserted into the first component and the second component of FIG. 5.

As shown in FIG. 10, the fastener 100 is ready to be locked. In this position, the fastener 100 is not locked and can still translate up relative to the center axis 164, or the first component 128 can slide down relative to the center axis 164 (see FIG. 2). As seen in the position of FIG. 10, both shoulders 106 are positioned below the first component 128 while the fingers 132 sit mostly below the first component 128. Depending on the thickness of the first component 128 and second component 130, the fingers 132 and shoulders 106 can be at different positions relative to the first component 128. In an alternative embodiment, most of the area of the fingers 132 may be in the aperture 126 rather than below the first component 128.

Figure 11:
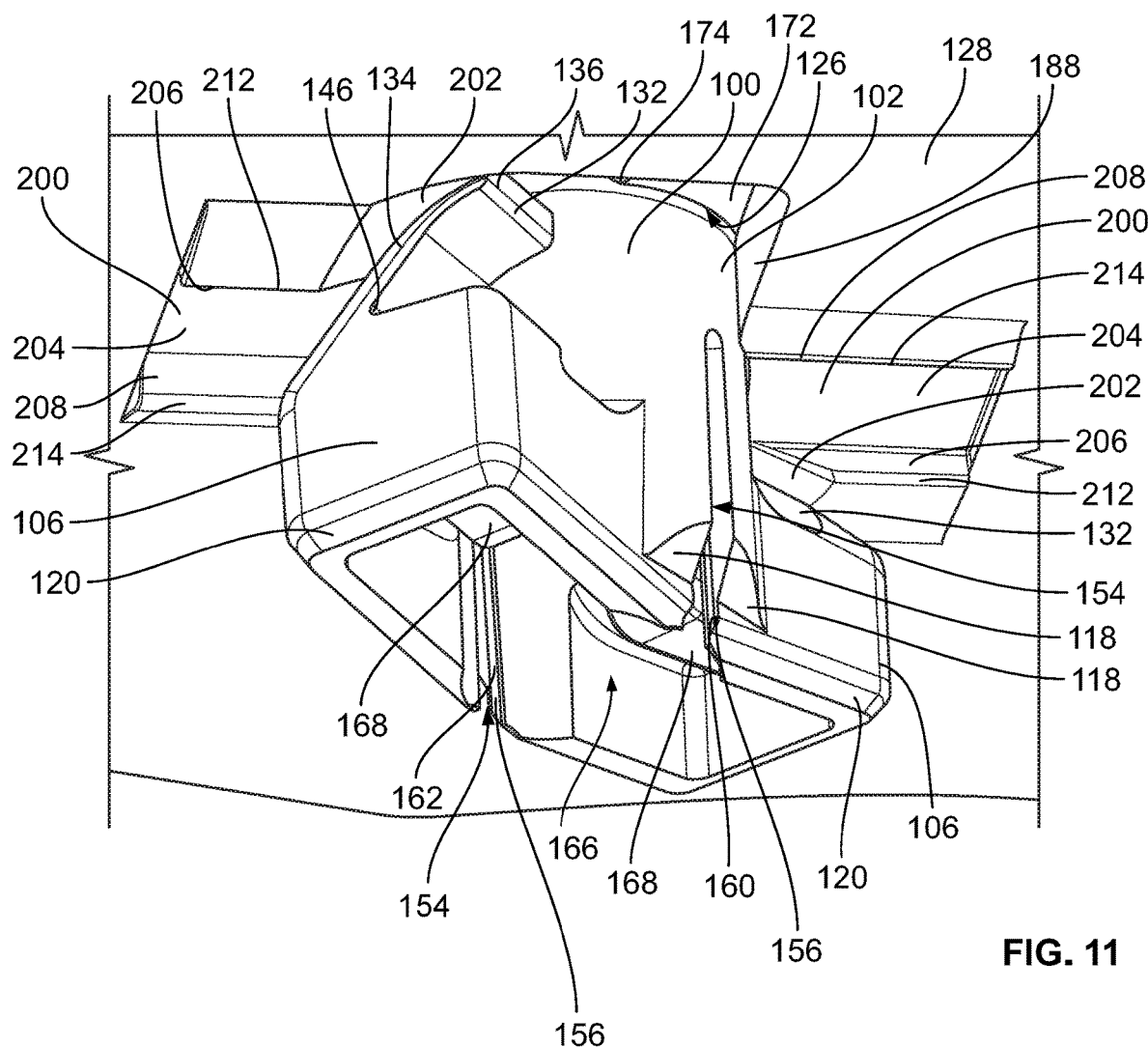
FIG. 11 is a bottom isometric view of the fastener of FIG. 10 turned 45° from its initial position within the first component and the second component.

During installation and as seen in FIG. 4, the plurality of graphics 176 indicate to the user to rotate the fastener 100 in a direction of arrow B. As discussed above, the user can place one finger in the groove 182, against the flat wall 184 of the finger tab 180, of each of the ridges 114. Therefore, the user can push along the flat walls 184 of the finger tabs 180, in the direction of arrow B, to rotate the fastener 100 to its installed or locked position. After rotating the fastener 100 in the direction of arrow B for 45°, or an eighth of a complete turn, the fastener 100 is in a partially installed configuration, as shown in FIG. 11. In this particular configuration, the fingers 132 are in contact with the lead-in walls 202 and the smooth edges 210 of the internal edges 188. As such, this contact causes the fingers 132 to flex along their pivot point 146. As the user continues to turn the fastener 100 along the direction of arrow B, the fingers 132 will continue to run along the lead-in walls 202 and the smooth edges 210 until it makes its way to the locking ramp 206.

Turning to FIGS. 10-14, after continued rotation of the fastener 100, the fingers 132 will run over the point 212 of the locking ramp 206, causing the fingers 132 to further flex along its pivot point 146. Once over the point 212 of the locking ramp 206, the fingers 132 may snap in place in the depressions 204 (see FIGS. 12 and 13). After the fingers 132 snap down in the depressions 204, the fastener 100 is in the installed or locked position, between the locking ramp 206 and the unlocking ramp 208. Further, the fingers 132 may provide an audio and tactile verification of installation once they snap into the depressions 204, i.e., its locked or installed position. Therefore, this will inform the user that they may stop rotation of the fastener 100, since the fastener 100 is in the installed position. In the installed configuration, the free end 136 of the fingers 132 may be locked in or cooperate with the depression 204 of the locking features 200. Once installed, the first component 128 and the second component 130 are held between the fingers 132 and the flange 112 of the head 104.

Figure 14:
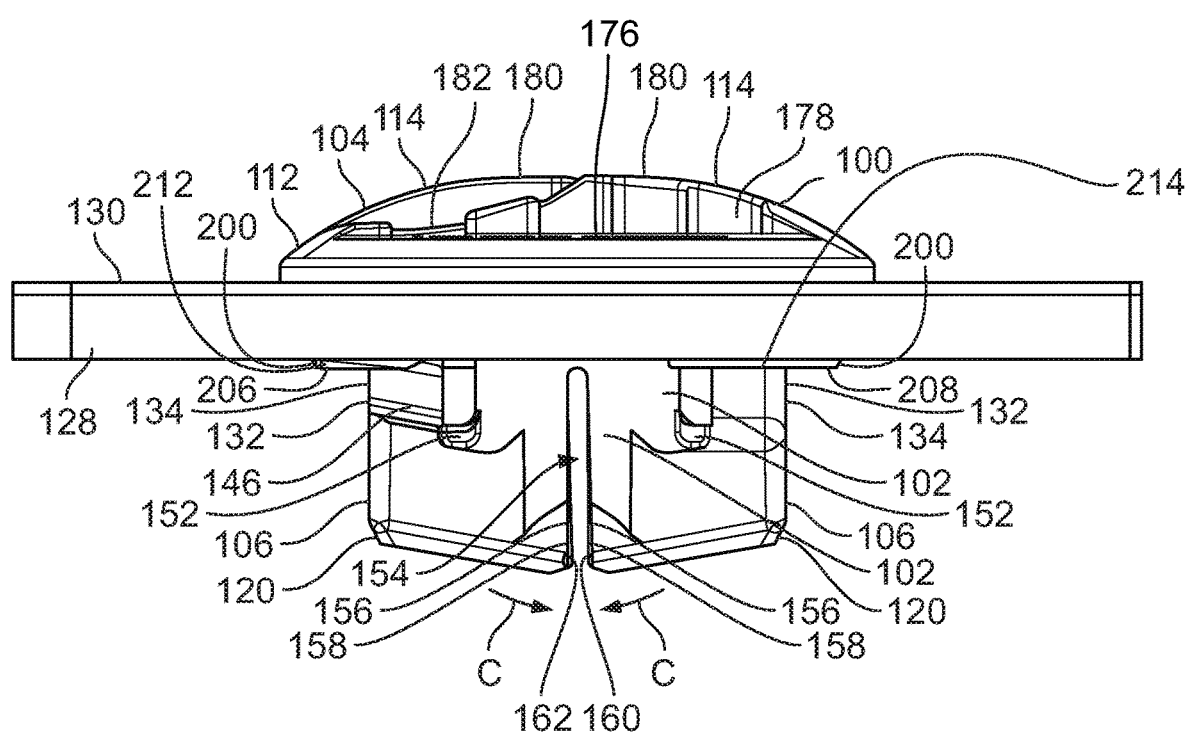
FIG. 14 is a front view of the fastener of FIG. 12 in the installed or locked position within the first component and the second component.

Depending on the thickness of the second component 130, the fingers 132 will flex at different angles to appropriately secure the first component 128 and the second component 130. As seen in FIG. 14, once the fingers 132 reach a maximum flex point, i.e., not capable of flexing anymore, the body 102 of the fastener 100 may flex inwardly, in a direction of arrows C, along the cutouts 154 to appropriately fasten the first component 128 and the second component 130. As discussed above, once the two sidewalls 156 make contact with each other, the locking components 158 will engage. Therefore, as discussed above, the protrusion 160 will lock within the recessed area 162 to strengthen the fastener 100 during extraction. As such, the extraction force can be maximized prior to part failure. In other words, the cutouts 154 of the body 102 provide additional support for the fastener 100 to accompany components with wide thickness levels, and the cutouts 154 maximize the failure load and extraction force of the fastener 100. As a result, the fastener 100 and the first component 128 can fasten a wide range of thicknesses of the second component 130. Put differently, the fastener 100 has increased functionality by allowing it to be used in components or panels with a wide thickness range.

In one non-limiting example, the fingers 132 allow for 0.1 mm-7.0 mm thickness variations in the first component 128 and/or the second component 130. In other words, the fingers 132 can flex to hold a component or panel that has a width range of 0.1 mm-7.0 mm. Similarly, the cutouts 154 allow for an additional 0.1 mm-7.0 mm thickness variation in the first component 128 and/or the second component 130 on top of the range allowed by the fingers 132. Preferably, the fingers 132 allow for an approximately 2.0 mm thickness variation while the cutouts 154 allow for an approximately additional or second 2.0 mm thickness variation. Therefore, the fastener 100 may be used on a wide range of panels or components with different thickness levels. Additionally, the fastener 100 may be used with a panel or component that may comprise non-flat or non-parallel surfaces, i.e., the thickness changes within the panel itself.

Figure 12:
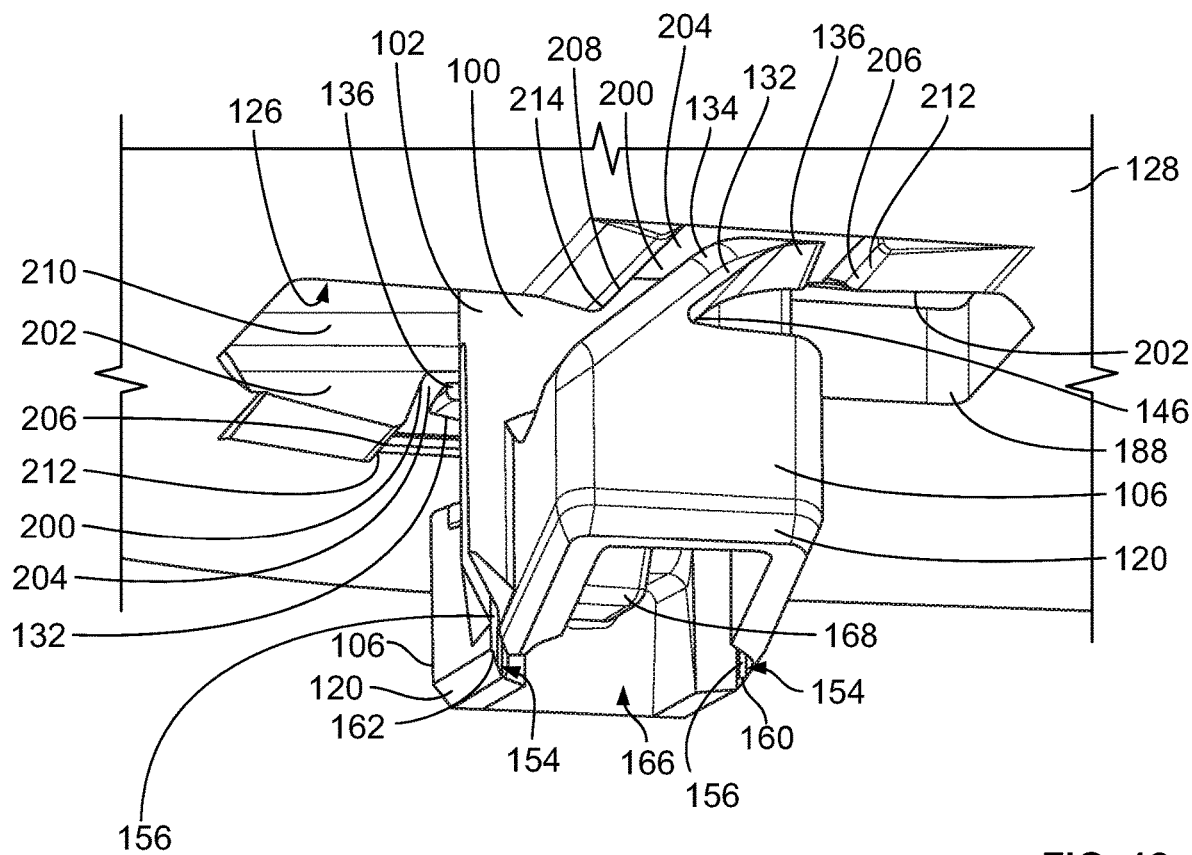
FIG. 12 is a bottom isometric view of the fastener of FIG. 10 in an installed or locked position within the first component and the second component.
Figure 13:
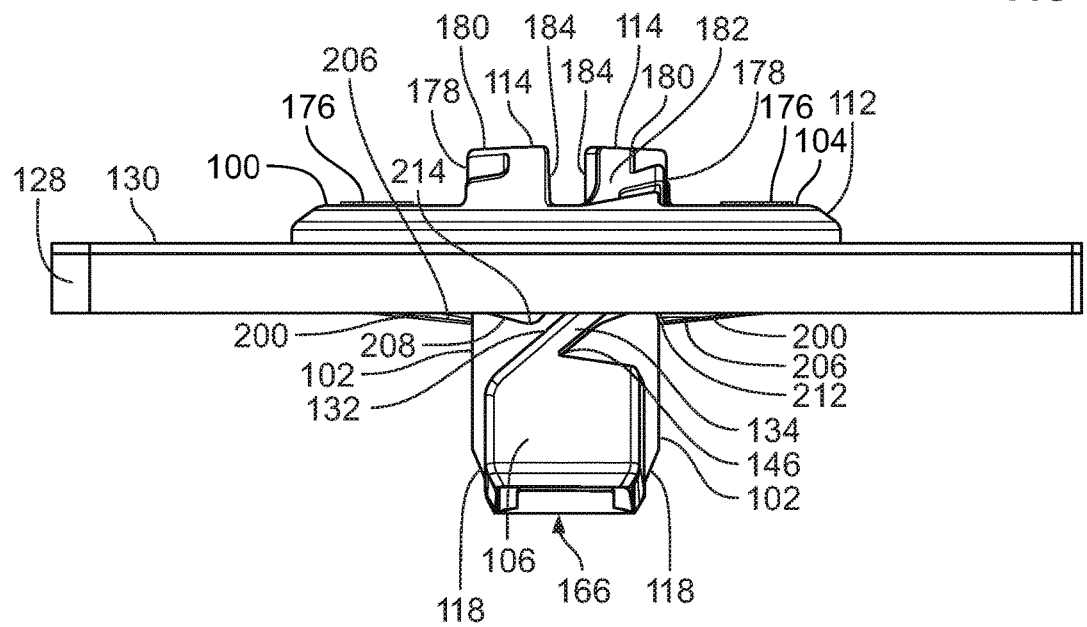
FIG. 13 is a side view of the fastener of FIG. 12 in the installed or locked position within the first component and the second component.

With reference to FIGS. 12-14, the fingers 132 of the fastener 100 are positioned between the locking ramp 206 and the unlocking ramp 208. As seen in FIG. 12, the locking ramps 206 limit the fingers 132 from rotating in the opposite direction of arrow B (see FIG. 9), thereby locking the fingers 132 in their respective depressions 204. Thus, the locking ramps 206 do not allow the user to rotate the fastener 100 in a direction opposite from the direction of arrow B.

In order for the user to disengage the fastener 100 from the first component 128 and the second component 130, the user must continue to rotate the fastener 100 along the direction of arrow B (see FIG. 9). While the user rotates the fastener 100, the fingers 132 of the fastener 100 can move along in the direction of arrow B over the unlocking ramps 208. As discussed above, the unlocking ramps 208 comprises an angled surface that meets at the apex 214. As a result, the unlocking ramps 208 allow the fingers 132 to slide out of the depressions 204 and rotate to an unlocked position (see FIG. 10).

Once the fastener 100 is in the unlocked position, the user my remove the fastener 100 from the first component 128 and the second component 130. Therefore, the fastener 100 can be used multiple times without compromising performance. Further, the user can easily remove the fastener 100 during maintenance if a new first component 128 or second component 130 is needed. Therefore, the fastener 100 is able to keep its maximized failure load while offering solutions for panels or components with a wider thickness range.

The configuration of the fingers 132 and the locking features 200 allow the fastener 100 to be rotated in only one direction, i.e., in the direction of arrow B (see FIG. 9), to lock the first component 128 and the second component 130. As such, the user may rotate the fastener 100 in the same direction to unlock and lock the fastener 100. As discussed above, the plurality of graphics 176 and the position of the finger tabs 180 and grooves 182 are designed to intuitively inform the user of this correct rotational direction. In this embodiment, the fastener 100 is able to rotate along 90° increments to lock or unlock the fastener 100. Put differently, the user can rotate the fastener 90°, or one quarter turn, to install the fastener 100 to the first component 128 and second component 130. Then, the user may rotate the fastener another 90°, i.e., 180° from the starting point, to unlock or uninstall the fastener 100 to remove the fastener 100. Therefore, the fastener 100 works in quarter turns or 90° increments. In alternative embodiments, the fastener 100 may work in different ranges or angles to securely fasten and unfasten the first component 128 and the second component 130. In a further embodiment, the fastener 100 may be rotated in any direction, or the fastener 100 may rotate in both a clockwise or counterclockwise direction.

Figure 15:
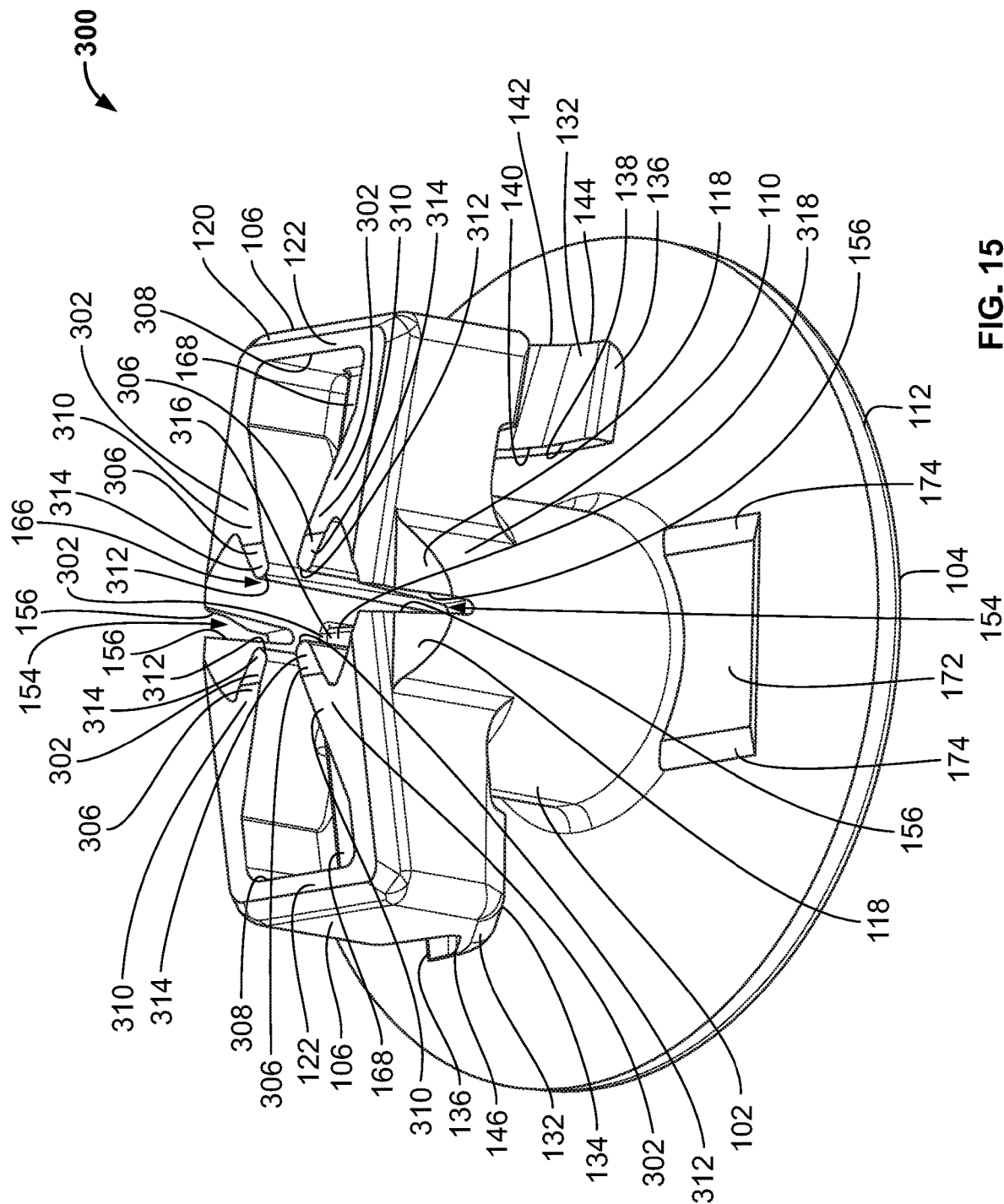
FIG. 15 is a bottom isometric view of another embodiment of a fastener.
Figure 16:
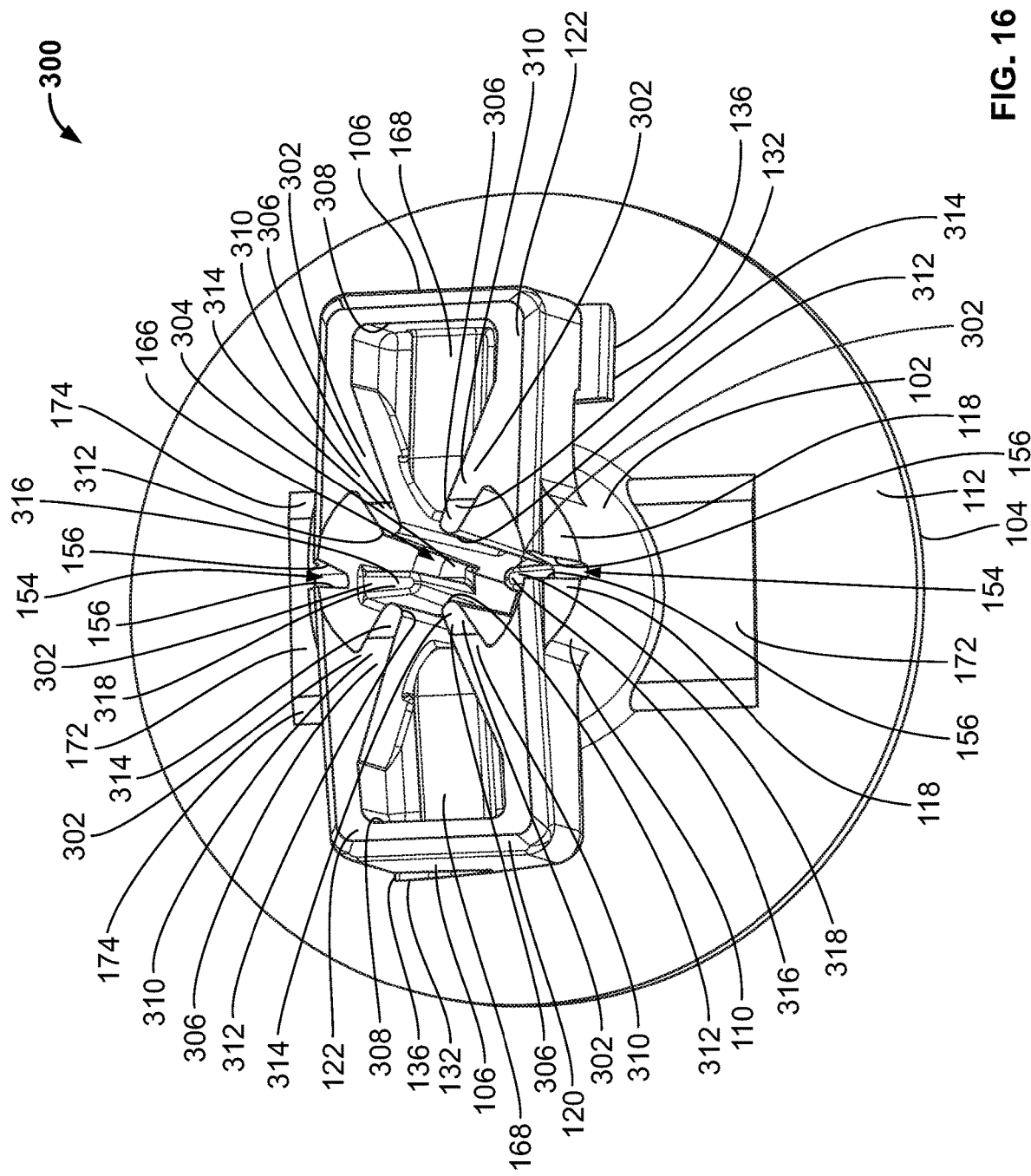
FIG. 16 is another bottom isometric view of the fastener of FIG. 15.
Figure 17:
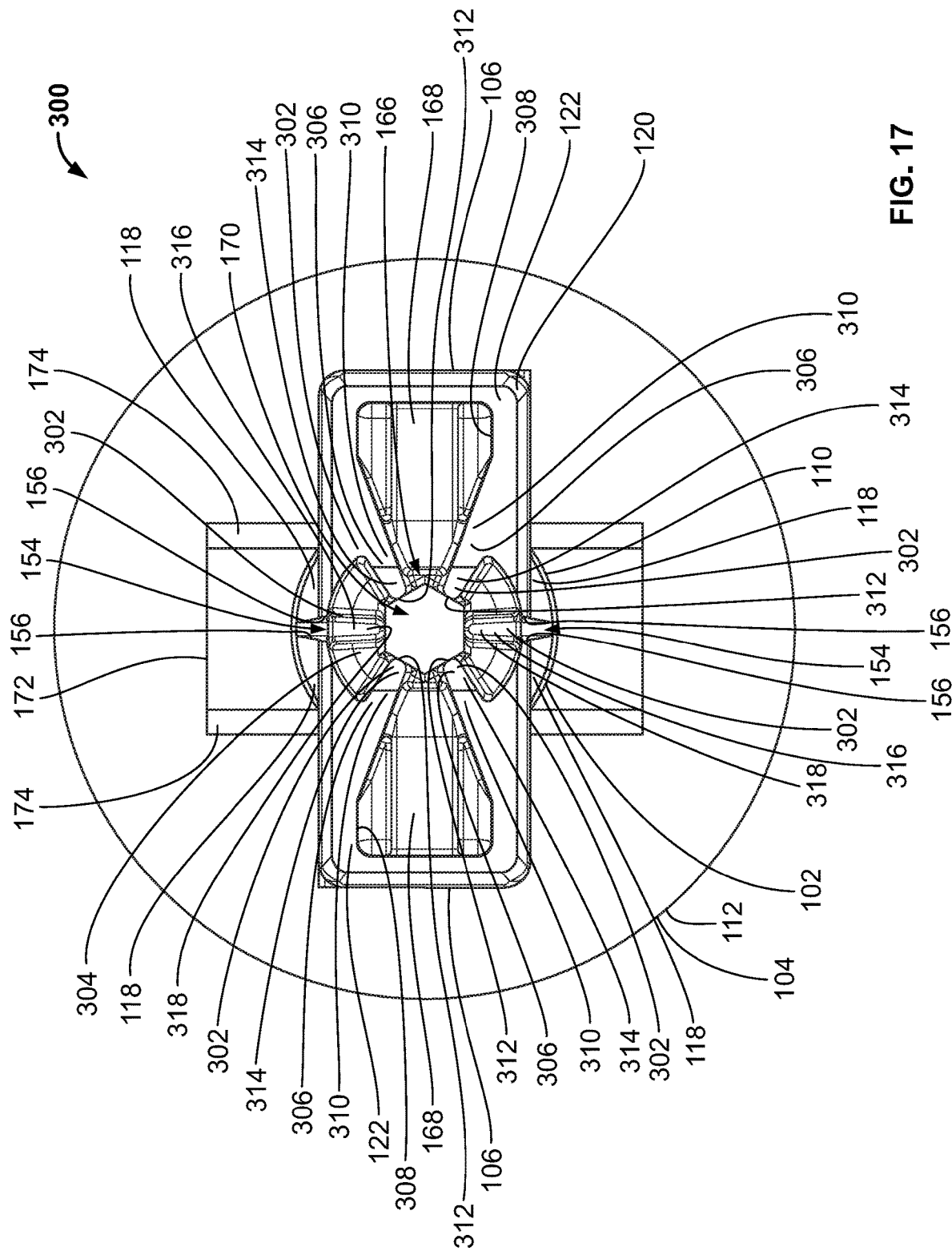
FIG. 17 is a bottom plan view of the fastener of FIG. 15.

With reference to FIGS. 15-17, like reference numbers are used with regard to an alternative embodiment of a fastener 300. The fastener 300 may comprise a similar configuration as discussed above with respect to the fastener 100. However, in this embodiment, the lower portion 110 of the body 102 may comprise a different configuration. Additionally, the hollow cavity 166 may include a plurality of extra ribs or support members 302 that extend from a top 304 of the hollow cavity 166, adjacent to the hole 170 (see FIG. 17). As seen in FIG. 15, the fastener 300 may also include the cutouts 154 extending through the body 102. However, in the present embodiment, the cutouts 154 may be substantially smaller than the cutout 154 of fastener 100. In fact, the cutouts 154 may extend up the body 102 to a position just past the lead-in edges 118. Similar to the fastener 100, each of the cutouts 154 of the fastener 300 includes two sidewalls 156 that converge toward each other. Alternatively, in the present embodiment, the cutouts 154 of the fastener 300 may not include any locking components 158 attached to the sidewalls 156. However, in other embodiments, the fastener 300 may include locking components 158 attached to the sidewall 156, similar to the fastener 100.

With reference to FIGS. 16 and 17, the hollow cavity 166 may be viewed. In the present embodiment, the support members 302 may include four main beams 306 that extend through the entire hollow cavity 166 to a positon generally flush with the flat base 122 of the shoulders 106. The main beams 306 may extend from an outer edge 308 of the flat base 122 to a position adjacent to the hole 170 (see FIG. 17). As discussed above, the main beams 306 are generally flush with the flat base 122, such that a bottom surface 310 of the main beams 306 may comprise an angled surface similar or parallel to the angle defined by the free end 136 of the fingers 132 and the flat base 122. Further, the bottom surface 310 of the main beams 306 may comprise a rounded edge 312 that is adjacently aligned with the hole 170 (see FIG. 17). The rounded edge 312 may include a surface 314 with a different planar angle then the bottom surface 310. In other embodiments, the fastener 300 may include a greater or fewer number of main beams 306.

With reference still to FIGS. 16 and 17, the support members 302 may comprise two secondary beams 316 that extend from the top portion 304 of the hollow cavity 166. The secondary beams 316 are aligned with the cutouts 154 and extend outwardly from the body 102. The secondary beams 316 extend only partially through the hollow cavity 166, and the secondary beams 316 end at a rounded tip 318, just prior to the cutouts 154. As seen in FIG. 17, the secondary beams 314 can be aligned with the cutouts 154 and comprise a generally similar shape. Further, the fastener 300 may include two secondary beams 316 on opposing sides of the hollow cavity 166. However, in alternative embodiments, the fastener 300 my include a greater or fewer number of secondary beams 316.

With reference to FIG. 17, the width of the main beams 306 and the secondary beams 314 may increase when going from the flat base 122 to the hole 170. Additionally, portions of the main beams 306 may extend into the reinforcement ribs 168 of the hollow cavity 166. Similar to the reinforcement ribs 168, the support members 302 may be used to reinforce the fastener 300 and maximize failure load. Therefore, the support members 302 and reduced cutouts 154 may allow the fastener 300 to be stronger and more ridged than the fastener 100. Further, the fastener 300 may operate in the exact same steps as described above with respect to the fastener 100. As such, the fastener 300 may be used to securely fasten the first component 128 and the second component together 130 by locking the fingers 132 in the locking features 200 of the first component 128 (not shown). Additionally, the fastener 300 my flex along the fingers 132 and cutouts 154 to accommodate thickness variations in the first component 128 and second component 130, similarly as discussed above with respect to the fastener 100.

Depending on the industrial application of the fastener 100, 300, the fastener 100, 300 may not include any fingers 132 extending from the shoulders 106. However, in such an embodiment, the fastener 100, 300 may still comprise the cutouts 154 extending through the body 102. As such, all of the flexing will occur in the cutouts 154 to accommodate different component thicknesses. Alternatively, in other embodiments, the fastener 100, 300 may not include the cutouts 154 extending through the body 102. However, each of the shoulders 106 of the fastener 100, 300 may still comprise a finger 132. As such, all of the flexing will occur in the fingers 132 to accommodate different component thicknesses. Therefore, the fastener 100, 300 may be configured for the specific purpose or function it is intended to perform.

As described above, the fastener 100, 300 may securely couple the first component 128 and the second component 130 together. Further, the fastener 100, 300 can be manufactured or designed to meet the specific specifications of the user. Additionally, the fastener 100, 300 can be installed multiple times without compromising its strength and failure load, and the fastener 100, 300 can have increased functionality by being compatible with components having a wide thickness range.

While various spatial and directional terms, such as top, bottom, lower, mid, lateral, horizontal, vertical, front, rear, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain how to practice the disclosure and will enable others skilled in the art to utilize the disclosure. The claims are to be construed to include alternative embodiments to the extent permitted by the prior art.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

We claim:
1. A fastener, comprising:
   a body;
   a fastener head comprising a flange extending radially outward from the body;
   a plurality of shoulders extending outwardly from the body, wherein each of the plurality of shoulders include a top end and a bottom end, the top end being closer to the fastener head than the bottom end;
   a finger extending from the top end of each of the shoulders; and
   a plurality of cutouts positioned on the body between the shoulders, wherein the body is flexible along the cutouts,
   wherein the fingers are flexible and cooperate with a plurality of locking features of a first component to sufficiently hold the first component and a second component between the fingers and the flange,
   wherein each of the cutouts comprise two sidewalls that converge toward each other, and
   wherein each of the sidewalls comprise a locking component that mates with a locking component of the other respective sidewall to lock the sidewalls of the cutouts together during application of an extraction force.

2. The fastener of claim 1, wherein the fingers protrude from the shoulders toward the flange and flex along a pivot point to secure the first component and the second component.

3. The fastener of claim 1, wherein the body is cylindrical and comprises a hollow cavity.

4. The fastener of claim 3, wherein the hollow cavity comprises a plurality of ribs and support members that extend from the shoulders to the fastener head, and wherein the ribs and the support members increase the fastener's maximum failure load.

5. The fastener of claim 1, wherein the locking features of the first component comprise a locking ramp and a depression, and wherein the fingers of the fastener are locked within the depression and the locking ramp of the first component when installed.

6. The fastener of claim 1, wherein the fastener is only capable of rotating in one direction to lock the first component and the second component together, and wherein the same direction is used to unlock the fastener from the first component and the second component.

7. A fastener, comprising:
   a body including a fastener head and a pair of opposing shoulders that extend outwardly from the body;
   a finger extending from an end of each of the shoulders and including a flexible free end that cooperates with a plurality of locking features of a first component; and
   a pair of cutouts within the body, which extend toward the fastener head, wherein the cutouts are positioned on opposite sides of the body,
   wherein each of the cutouts define an opening through their respective side of the body, and
   wherein the body is flexible along the cutouts to allow the body to flex with the fingers to secure the first component and a second component.

8. The fastener of claim 7, wherein the body is cylindrical and comprises a hollow cavity, and wherein the hollow cavity comprises a plurality of support members extending therethrough.

9. The fastener of claim 7, wherein the fastener is only capable of rotating in one direction to lock the first component and the second component together.

10. The fastener of claim 7, wherein the fastener head comprises a flange extending radially outward from an upper portion of the body.

11. The fastener of claim 10, wherein the flange includes two convex ridges that bow outwardly toward an outer edge of the flange.

12. The fastener of claim 11, wherein each of the ridges include a finger tab and a groove inverse of each other with respect to the other ridge.

13. The fastener of claim 7, wherein the locking features of the first component comprise a locking ramp, a depression, and an unlocking ramp, and wherein the fingers of the fastener are locked within the depression between the locking ramp and the unlocking ramp.

14. The fastener of claim 7, wherein the fingers allow for up to a 2.0 mm thickness variation in the first component and the second component, and wherein the cutouts allow for up to a second 2.0 mm thickness variation in the first component and the second component.

15. A fastener, comprising:
   a cylindrical body including a fastener head and a pair of shoulders extending outwardly from a lower portion and on opposite sides of the cylindrical body, wherein the cylindrical body further includes a hollow cavity;

a finger extending from an end of each of the shoulders and comprising a flexible free end that cooperates with a plurality of locking features of a first component; and a pair of cutouts positioned at opposite sides of the cylindrical body and between the pair of shoulders, wherein each of the cutouts comprise two sidewalls, wherein the cylindrical body is flexible along the cutouts to allow the cylindrical body to flex with the fingers and secure the first component and a second component, and wherein the pair of cutouts each comprises locking components that lock the two sidewalls of each of the cutouts together during application of an extraction force.

16. The fastener of claim 15, wherein the locking components comprise a circular protrusion and a recessed area.

17. The fastener of claim 16, wherein the circular protrusion locks within the recessed area to strengthen the fastener during application of the extraction force.

18. The fastener of claim 15, wherein the fastener provides an audio and tactile verification once installed.

* * * * *